(12) United States Patent
Yamada et al.

(10) Patent No.: US 11,760,322 B2
(45) Date of Patent: Sep. 19, 2023

(54) ON-VEHICLE CONTROL DEVICE

(71) Applicant: Hitachi Automotive Systems, Ltd., Hitachinaka (JP)

(72) Inventors: Tetsuya Yamada, Tokyo (JP); Shogo Nakao, Tokyo (JP); Toshiyuki Innami, Hitachinaka (JP); Koichi Yokoura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 106 days.

(21) Appl. No.: 16/485,530

(22) PCT Filed: Dec. 6, 2017

(86) PCT No.: PCT/JP2017/043847
§ 371 (c)(1),
(2) Date: Aug. 13, 2019

(87) PCT Pub. No.: WO2018/150692
PCT Pub. Date: Aug. 23, 2018

(65) Prior Publication Data
US 2019/0359188 A1 Nov. 28, 2019

(30) Foreign Application Priority Data
Feb. 16, 2017 (JP) .................. 2017-026757

(51) Int. Cl.
*B60T 8/00* (2006.01)
*B60T 8/173* (2006.01)
(Continued)

(52) U.S. Cl.
CPC ............ *B60T 8/173* (2013.01); *B60T 8/1755* (2013.01); *B60T 8/88* (2013.01); *B60W 50/0205* (2013.01)

(58) Field of Classification Search
CPC .......... B60T 8/173; B60T 8/1755; B60T 8/88; B60W 50/0205
See application file for complete search history.

(56) References Cited

U.S. PATENT DOCUMENTS 5,957,983 A 9/1999 Tominaga
6,374,162 B1* 4/2002 Tanaka .................. B60T 8/1755
180/197

(Continued)

FOREIGN PATENT DOCUMENTS

CN 102227758 A 10/2011
CN 105083257 A 11/2015
(Continued)

OTHER PUBLICATIONS

Chinese-language Office Action issued in Chinese Application No. 201780083592.X dated Nov. 30, 2020 with partial English translation (nine (9) pages).

(Continued)

*Primary Examiner* — Truc M Do
(74) *Attorney, Agent, or Firm* — Crowell & Moring LLP

(57) ABSTRACT

An on-vehicle control device includes: a control unit that controls an attitude of a vehicle based on a value of a behavior sensor that detects a behavior of the vehicle, and prohibits control based on the behavior sensor when the value of the behavior sensor exceeds a threshold; and a travel environment determination unit that determines a travel environment of the vehicle based on image information captured by a camera, and in which the control unit changes the threshold to a lower value based on the travel environment determined by the travel environment determination unit.

6 Claims, 14 Drawing Sheets

(51) Int. Cl.
*B60T 8/1755* (2006.01)
*B60T 8/88* (2006.01)
*B60W 50/02* (2012.01)

(56) References Cited

U.S. PATENT DOCUMENTS

| | | | |
|---|---|---|---|
| 6,427,102 B1 | 7/2002 | Ding | |
| 7,684,945 B2 | 3/2010 | Walter et al. | |
| 2005/0090950 A1* | 4/2005 | Sawamoto | G08G 1/166 701/28 |
| 2008/0172156 A1* | 7/2008 | Joh | G01S 13/723 701/45 |
| 2009/0089002 A1 | 4/2009 | Walter et al. | |
| 2009/0143951 A1* | 6/2009 | Takahashi | B60T 7/22 701/70 |
| 2011/0187515 A1 | 8/2011 | Saito et al. | |
| 2011/0251748 A1* | 10/2011 | Moran | B60W 30/18118 701/31.4 |
| 2011/0261168 A1 | 10/2011 | Shima et al. | |
| 2012/0307088 A1 | 12/2012 | Han | |
| 2013/0080019 A1* | 3/2013 | Isaji | B60W 30/16 701/96 |
| 2013/0261915 A1* | 10/2013 | Tokimasa | B60W 10/18 701/70 |
| 2014/0046532 A1* | 2/2014 | Saito | B60W 50/0205 701/30.4 |
| 2015/0321655 A1 | 11/2015 | Kim et al. | |
| 2016/0090100 A1* | 3/2016 | Oyama | B60W 10/184 701/23 |
| 2017/0021812 A1* | 1/2017 | Sugano | B60K 28/08 |
| 2018/0118201 A1 | 5/2018 | Matsunaga et al. | |

FOREIGN PATENT DOCUMENTS

| | | |
|---|---|---|
| DE | 199 36 439 A1 | 8/2000 |
| DE | 10 2006 018 974 A1 | 10/2007 |
| EP | 2 289 744 A2 | 3/2011 |
| JP | 9-245298 A | 9/1997 |
| JP | 2004-142629 A | 5/2004 |
| JP | 2009-119970 A | 6/2009 |
| JP | 2009-120082 A | 6/2009 |
| JP | 2010-70069 A | 4/2010 |
| JP | 2010-280271 A | 12/2010 |
| WO | WO 00/46087 A1 | 8/2000 |
| WO | WO 2016/158237 A1 | 10/2016 |

OTHER PUBLICATIONS

International Search Report (PCT/ISA/210) issued in PCT Application No. PCT/JP2017/043847 dated Mar. 13, 2018 with English translation (five (5) pages).
Japanese-language Written Opinion (PCT/ISA/237) issued in PCT Application No. PCT/JP2017/043847 dated Mar. 13, 2018 (three (3) pages).
Extended European Search Report issued in European Application No. 17897145.3 dated Oct. 29, 2020 (seven (7) pages).

* cited by examiner

FIG. 10

| CAN ID | | TRAVEL ENVIRONMENT DATA | | | # COMMENT |
|---|---|---|---|---|---|
| | | DATA 1 | DATA 2 | DATA 3 | |
| C1 | 0x0200 (LINEAR DISTANCE) | STRAIGHT ROAD | 100 | 90 | FRONT LINEAR DISTANCE 100m, STEERING ANGLE 0 DEGREE, RELIABILITY 90% |
| C2 | 0x0210 (OBSTACLE) | OBSTACLE | 80 | 99 | DISTANCE TO OBSTACLE 80m, RELIABILITY 99% |
| C3 | 0x0220 (FRONT ROAD SURFACE FRICTION COEFFICIENT) | FRICTION COEFFICIENT | 0.60 | 70 | FRONT ROAD SURFACE FRICTION COEFFICIENT $\mu=0.60$, RELIABILITY 70% |
| | ⋮ | ⋮ | ⋮ | ⋮ | ⋮ |

FIG. 11

| INPUT: SENSOR IDENTIFIER | INPUT: CONDITION PARAMETER | | | OUTPUT: CONTROL THRESHOLD |
|---|---|---|---|---|
| | CONDITION 1 | CONDITION 2 | CONDITION 3 | |
| D1 YAW RATE SENSOR | STRAIGHT ROAD | LINEAR DISTANCE EQUAL TO OR MORE THAN 100m | | YAW RATE SENSOR 30% |
| D2 YAW RATE SENSOR | STRAIGHT ROAD | LINEAR DISTANCE EQUAL TO OR MORE THAN 50m AND LESS THAN 100m | | YAW RATE SENSOR 80% |
| D3 YAW RATE SENSOR | STRAIGHT ROAD | LINEAR DISTANCE LESS THAN 50m | | YAW RATE SENSOR 100% |
| D4 LONGITUDINAL G SENSOR | OBSTACLE | FRONT OBSTACLE FARTHER THAN 30m | | LONGITUDINAL G SENSOR 50% |
| D5 LONGITUDINAL G SENSOR | OBSTACLE | FRONT OBSTACLE WITHIN 30m | FRONT ROAD SURFACE FRICTION COEFFICIENT EQUAL TO OR HIGHER THAN 0.4 | LONGITUDINAL G SENSOR 75% |
| D6 LONGITUDINAL G SENSOR | OBSTACLE | FRONT OBSTACLE WITHIN 30m | FRONT ROAD SURFACE FRICTION COEFFICIENT LOWER THAN 0.4 | LONGITUDINAL G SENSOR 100% |
| ⋮ | ⋮ | ⋮ | ⋮ | ⋮ |

213

ON-VEHICLE CONTROL DEVICE

TECHNICAL FIELD

The present invention relates to an on-vehicle control device.

BACKGROUND ART

Behavior sensors such as a yaw rate sensor and an acceleration sensor that detect behaviors of a vehicle are mounted on the vehicle. Further, an attitude of the vehicle is controlled based on values of the behavior sensors, and the behavior sensors are made redundant, for example, duplicated for safety reasons.

For example, PTL 1 discloses a device which includes a magnetic sensor detecting magnetism of a magnetic marker embedded in a road and a camera recognizing a white line are provided and in which both the magnetic sensor and the camera output lateral displacement distances, and the equivalent function is replaced with the camera when the magnetic sensor is determined to be faulty.

The vehicle is under the influence of high temperature and vibration, and there is a case where the behavior sensor mounted on the vehicle inputs an incorrect value for a fixed period due to a temporary fault caused by noise or the like. If control intervention is performed based on this sensor value, there is a risk that control such as unintended brake may be performed. Thus, it is required not to perform the control intervention based on the incorrect value of the behavior sensor.

CITATION LIST

Patent Literature

PTL 1: JP H9-245298 A

SUMMARY OF INVENTION

Technical Problem

In the device of PTL 1, it is difficult to suppress the control intervention based on the incorrect value of the behavior sensor.

Solution to Problem

According to one aspect of the present invention, an on-vehicle control device includes: a control unit that controls an attitude of a vehicle based on a value of a behavior sensor that detects a behavior of the vehicle, and prohibits control based on the behavior sensor when the value of the behavior sensor exceeds a threshold; and a travel environment determination unit that determines a travel environment of the vehicle based on image information captured by a camera, in which the control unit changes the threshold to a lower value based on the travel environment by the travel environment determination unit.

Advantageous Effects of Invention

According to the present invention, it is possible to suppress control intervention based on an incorrect value of the behavior sensor.

BRIEF DESCRIPTION OF DRAWINGS

FIG. 10 is a view illustrating an example of travel environment information created by a travel environment information creation unit.

FIG. 11 is a view illustrating an example of a threshold table.

DESCRIPTION OF EMBODIMENTS

Hereinafter, embodiments of an on-vehicle control device according to the present invention will be described with reference to the drawings.

Figure 1:
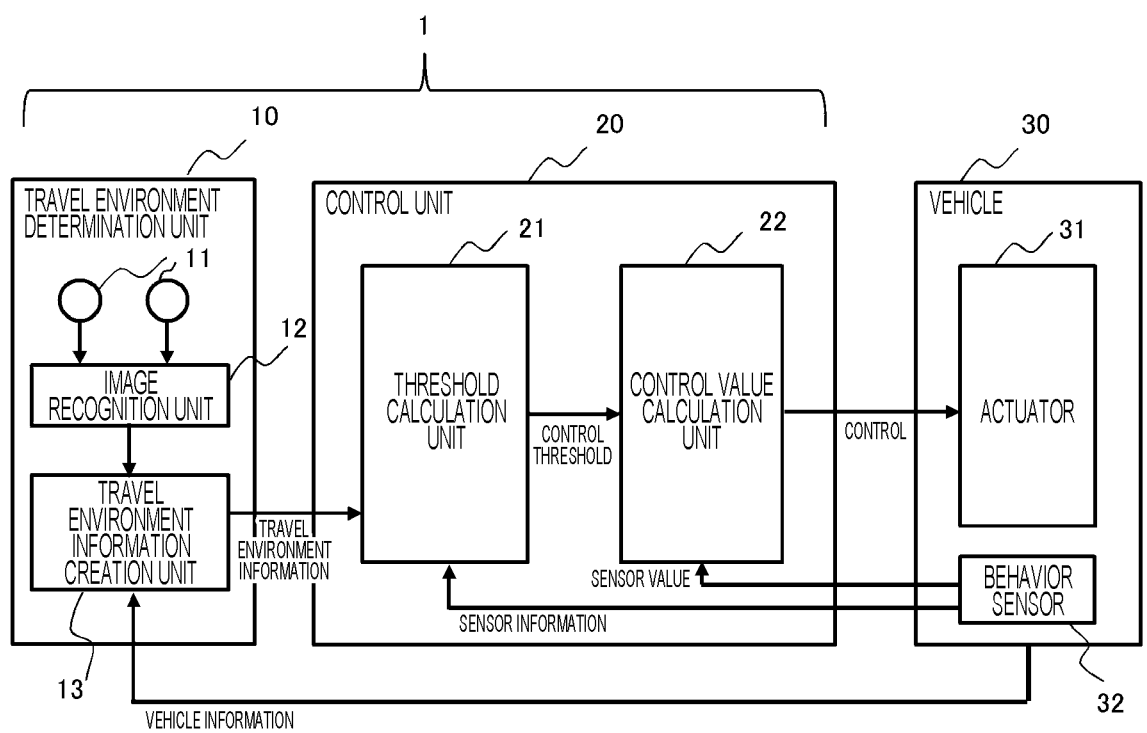
FIG. 1 is an overall configuration diagram illustrating an on-vehicle device and a vehicle.

FIG. 1 is an overall configuration diagram illustrating an on-vehicle control device 1 and a vehicle 30. The on-vehicle control device 1 includes a travel environment determination unit 10 and a control unit 20. The on-vehicle control device 1 is mounted on the vehicle 30.

The travel environment determination unit 10 includes a camera 11, an image recognition unit 12, and a travel environment information creation unit 13. The camera 11 is, for example, a stereo camera that captures a front side of the vehicle 30 in a traveling direction. Image information captured by the camera 11 is input to the image recognition unit 12. The image recognition unit 12 recognizes the image information, and recognizes how many meters of a straight road a front road where the vehicle is traveling corresponds to and how many meters ahead there is an obstacle on the front side (a vehicle or the like on the front side). In addition, the image recognition unit 12 obtains a friction coefficient of a road surface on which the vehicle is traveling based on the image information. The friction coefficient of the road surface is obtained, for example, by providing a deflection filter in the camera 11, comparing image information of light passing through the deflection filter with a value, obtained by applying a filter such as Fourier transform on the image information of light not passing through the deflection filter, and referring to a dictionary in which a result of the comparison and a friction coefficient μ of the road surface have been recorded. As a result, it is recognized whether or not the road on which the vehicle is traveling is difficult to slip.

The information indicating the straight road, the information indicating the friction coefficient μ of the road surface, and the like, which have been recognized by the image recognition unit 12, are input to the travel environment information creation unit 13. Vehicle information such as a steering angle is also input from the vehicle 30 to the travel environment information creation unit 13. The travel environment information creation unit 13 creates travel environment information, which will be described later, based on the input information. For example, if a straight road of a total length of 100 m has been recognized by the image recognition and the steering angle according to the vehicle information is zero, travel environment information indicating that the road is the straight road of 100 m with high reliability is created. The created travel environment information is input to the control unit 20.

The control unit 20 includes a threshold calculation unit 21 and a control value calculation unit 22. The threshold calculation unit 21 obtains and outputs a control threshold based on the travel environment information input from travel environment information creation unit 13 and sensor information input from a behavior sensor 32 of the vehicle 30. The behavior sensor 32 is a yaw rate or a longitudinal G sensor of the vehicle. In general, the control unit 20 sets a default threshold to an output value of the behavior sensor 32 such that control intervention based on the behavior sensor 32 is not performed when a large sensor value exceeding the default threshold is output due to a fault of the behavior sensor 32 or the like. The default threshold is a default threshold set in advance. Further, in the present embodiment, for example, when the travel environment is favorable and sensor information of a value, equal to or less than the default threshold but is large, is output from the behavior sensor 32, the control unit 20 regards the sensor information as an incorrect value. The incorrect value of the behavior sensor 32 is temporarily output due to the influence of high temperature, vibration, noise, or the like. In this case, in the present embodiment, the default threshold is changed to a control threshold having a lower value, and the control intervention by the control unit 20 is suppressed, thereby suppressing the control intervention based on the incorrect value of the behavior sensor 32 and promoting functional safety. Here, the control intervention is a concept that also includes execution of various types of control based on the sensor information.

The control threshold from the threshold calculation unit 21 and the sensor value from the behavior sensor 32 are input to the control value calculation unit 22. When no control threshold is input from the threshold calculation unit 21, the control value calculation unit 22 controls the actuator 31 of the vehicle 30 based on the input sensor value if the sensor value input from the behavior sensor 32 is equal to or less than the default threshold. Incidentally, the actuator 31 is an actuator used for brake control, engine drive control, and the like. On the other hand, when the control threshold is input from the threshold calculation unit 21, the control value calculation unit 22 changes the default threshold of the sensor to a lower control threshold, and as a result, control intervention due to the temporarily incorrect value of the behavior sensor 32 is suppressed.

The vehicle 30 includes the actuator 31 and the behavior sensor 32. Further, the vehicle 30 includes a control system such as an electronic stability control device (not illustrated) controlled by an actuator 31 and an anti-block brake system (ABS).

Figure 2:
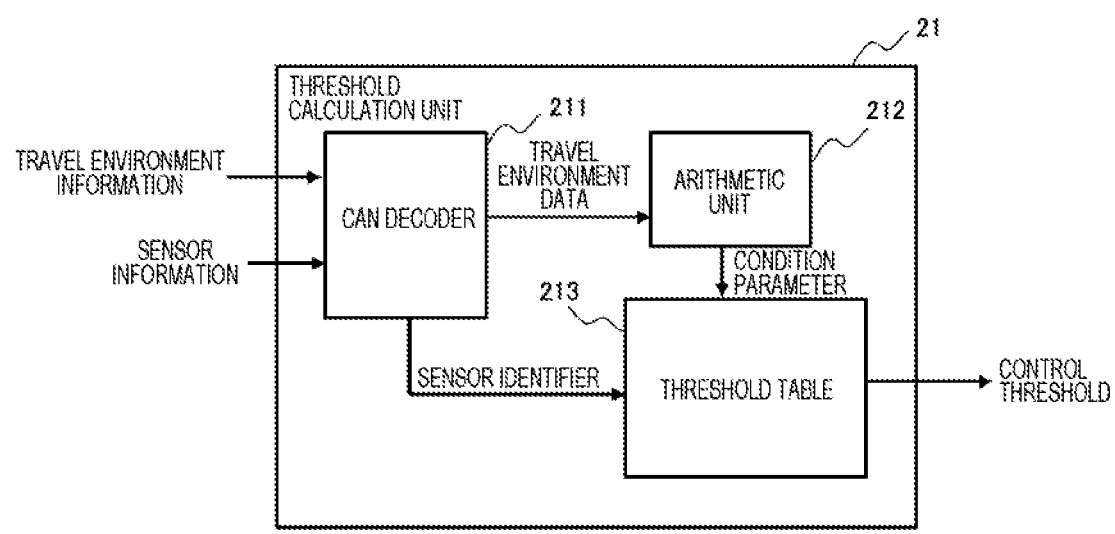
FIG. 2 is a block diagram of a threshold calculation unit.

FIG. 2 is a block diagram of the threshold calculation unit 21.

The threshold calculation unit 21 includes a CAN decoder 211, an arithmetic unit 212, and a threshold table 213. The CAN decoder 211 decodes travel environment information of a CAN data format, which has been input from the travel environment information creation unit 13 based on the sensor information input from behavior sensor 32, and outputs the travel environment data obtained by decoding to the arithmetic unit 212. In addition, the CAN decoder 211 outputs a sensor identifier to the threshold table 213.

The arithmetic unit 212 converts the travel environment information into a format of a condition parameter including Condition 1 to Condition 3 and outputs the converted information to the threshold table 213. The threshold table 213 is a table storing control thresholds associated with sensor identifiers and condition parameters, respectively, and outputs a control threshold that matches the input sensor identifier and condition parameter. Details of the threshold table 213 will be described later.

Figure 3:
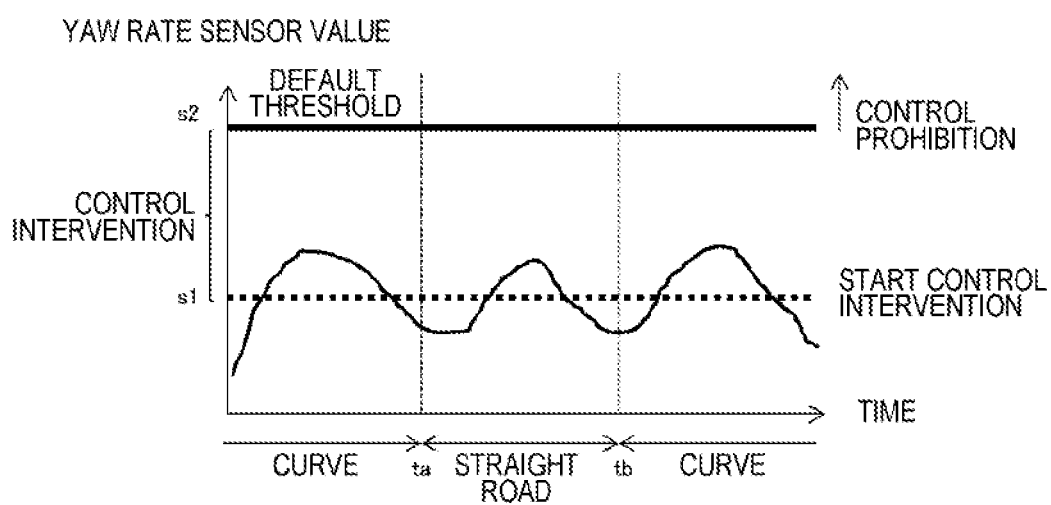
FIG. 3 is a time chart illustrating an output of a general yaw rate sensor and a default threshold.
Figure 4:
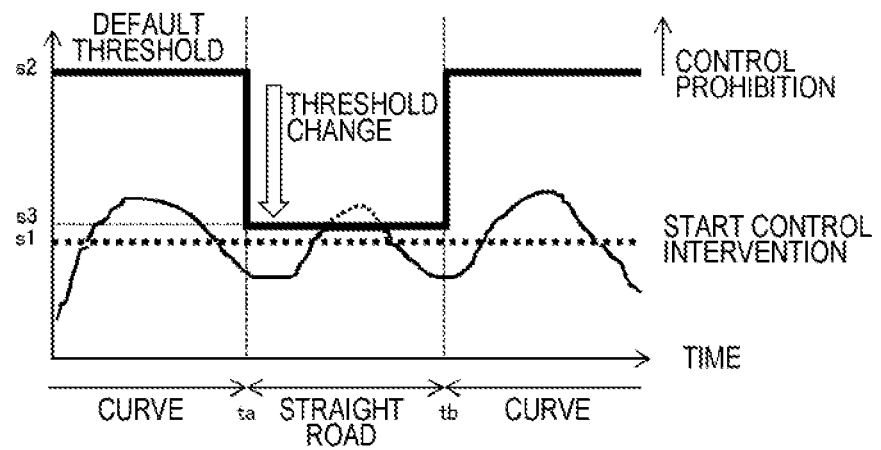
FIG. 4 is a time chart illustrating the output of the yaw rate sensor and a threshold change according to the present embodiment.

FIG. 3 is a time chart illustrating an output of a general yaw rate sensor and a default threshold, and FIG. 4 is a time chart illustrating the output of the yaw rate sensor and a threshold change according to the present embodiment. The horizontal axes in FIGS. 3 and 4 represent time, and the vertical axes represent an output value of the yaw rate sensor, and FIGS. 3 and 4 illustrate an example in which the vehicle has traveled on a curve until time ta, a straight road between time ta and time tb, and then, a curve.

As illustrated in FIG. 3, a yaw rate sensor value along with the traveling of the vehicle 30 varies with time. In general, a default threshold is provided for the output value of the yaw rate sensor such that the output of the yaw rate sensor is prohibited when a large sensor value exceeding a default threshold s2 is output due to a fault or the like of the yaw rate sensor. A threshold s1 is the smallest value at which control intervention starts, and the control in accordance with the output value of the yaw rate sensor is performed in a range from the threshold s1 to the default threshold s2. The control intervention is prohibited at a value exceeding the default threshold s2, which is handled as an obvious fault of the sensor. In general, when the sensor value is equal to or more than the threshold s1 in a range of not exceeding the default threshold s2 even in a case where the vehicle 30 is traveling on a straight road, the control intervention by the control system of the vehicle is performed.

In the present embodiment, the default threshold is changed to the control threshold when the vehicle 30 is traveling on the straight road as illustrated in FIG. 4. That is, the default threshold s2 is changed to a threshold s3 between time ta and time tb. During this period, the control intervention is performed between the threshold s1 and the threshold s3, and the control intervention is not performed when the sensor value exceeds the threshold s3. Incidentally, it is also possible to change the default threshold s2 to the threshold s1, and in this case, the control intervention is not performed when the sensor value exceeds the threshold s1. In this manner, when the travel environment is favorable, it is possible to suppress the control intervention based on the incorrect value temporarily output from the behavior sensor 32 due to the influence of high temperature, vibration, noise, or the like.

Figure 5:
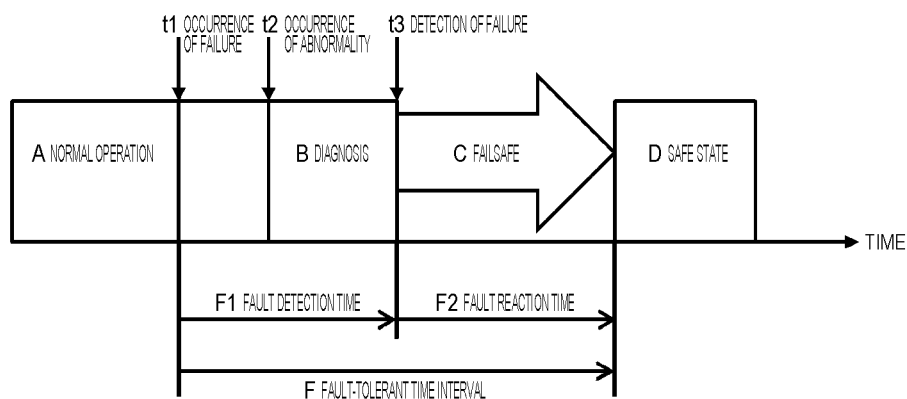
FIG. 5 is a view for describing a fault-tolerant time interval.

FIG. 5 is a view for describing a fault-tolerant time interval (FTTI).

In FIG. 5, the horizontal axis represents a lapse of time. A case where the vehicle 30 is normally operated and a fault has occurred at time t1 is illustrated. After the fault at time t1, an abnormality occurs in the vehicle 30 at time t2. After diagnosis, a fault is detected at time t3. After fail safe, the state is shifted to a safe state. A time from the occurrence of the fault to transition to the safe state is called the fault-tolerant time interval FTTI. The fault-tolerant time interval FTTI can be expressed as the sum of a fault detection time F1 from the diagnosis of the occurrence of the fault to the detection of the fault and a fault reaction time F2 from the detection of the fault to the transition to the safe state.

Figure 6:
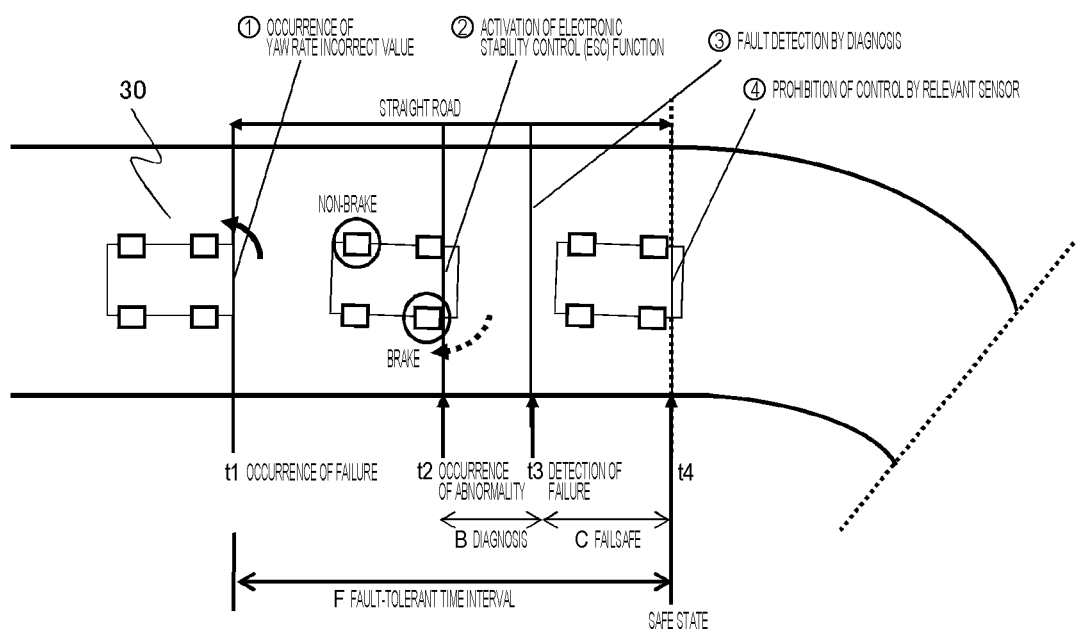
FIG. 6 is a view illustrating a general travel model of a vehicle based on a yaw rate sensor.
Figure 7:
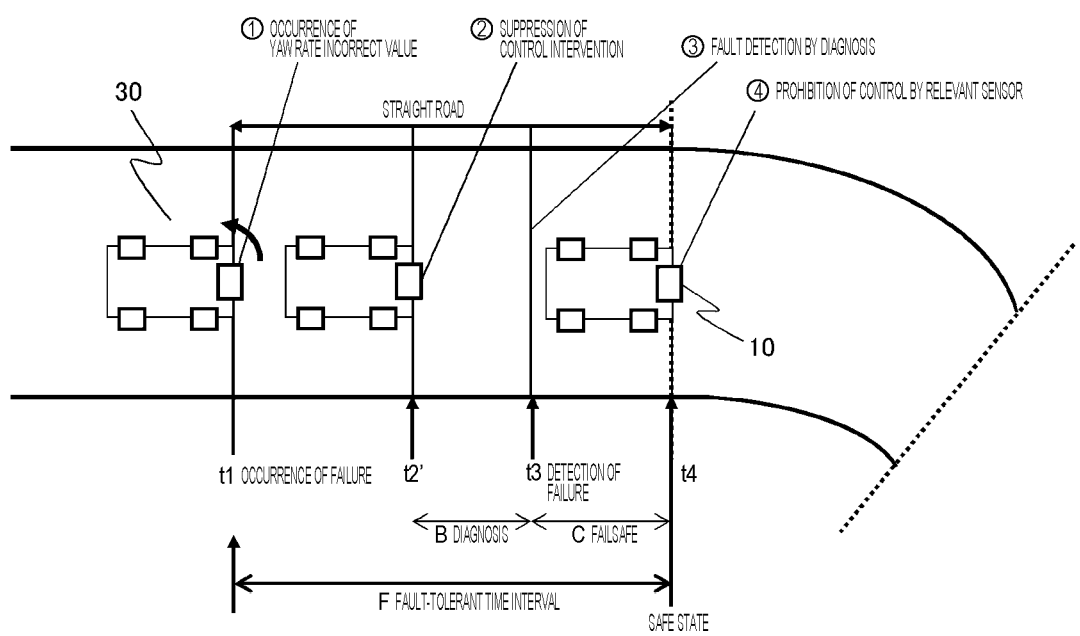
FIG. 7 is a view illustrating a travel model of a vehicle based on the yaw rate sensor according to the present embodiment.

FIG. 6 is a view illustrating a general travel model of the vehicle 30 based on the yaw rate sensor, and FIG. 7 is a view illustrating a travel model of the vehicle 30 based on the yaw rate sensor according to the present embodiment. In FIGS. 6 and 7, a travel path of the vehicle 30 is the same, and FIGS. 6 and 7 illustrate an example in which the vehicle 30 has traveled on a straight road until time t4, and then, a curve.

As illustrated in FIG. 6, a time between time t1 and time t4 corresponds to the fault-tolerant time interval FTTI. It is assumed that an incorrect value of the yaw rate sensor is generated counterclockwise in the vehicle 30 at time t1. The incorrect yaw rate sensor value is transmitted to the control unit. In order to return a position of the vehicle 30 based on the incorrect value after a certain period of time, the electronic stability control device, which is not originally required, is activated, and the vehicle 30 is controlled to rotate clockwise. Diagnosis is performed between time t2 and time t3, and as a result of the diagnosis, it is detected that the yaw rate sensor is faulty, fail safe is performed between time t3 and time t4, and control intervention using the yaw rate sensor is prohibited after time t4.

In the present embodiment, as illustrated in FIG. 7, an incorrect value of the yaw rate sensor is generated counterclockwise in the vehicle 30 at time t1, and the incorrect yaw rate sensor value is transmitted to the control unit. Meanwhile, when determining that the vehicle 30 is traveling on the straight road, the control unit prohibits the control intervention based on the incorrect yaw rate sensor value at time t2'. Further, diagnosis is performed, and as a result of the diagnosis, it is detected that the yaw rate sensor is faulty, fail safe is performed between time t3 and time t4, and control intervention using the yaw rate sensor is prohibited after time t4.

Figure 8:
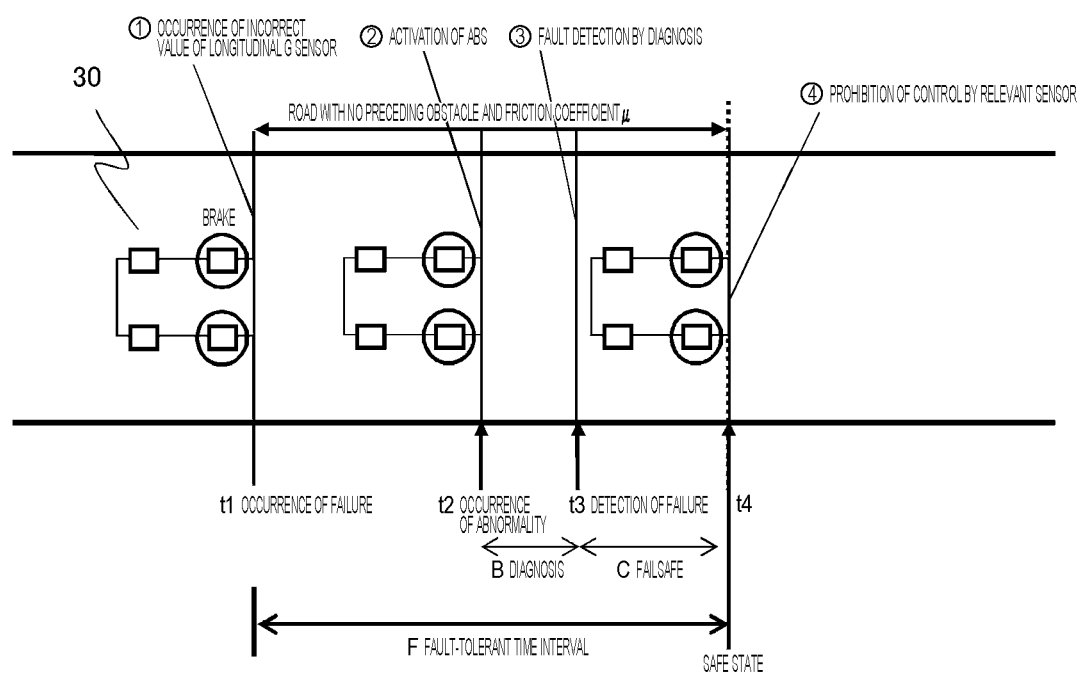
FIG. 8 is a view illustrating a general travel model of a vehicle based on a longitudinal G sensor.
Figure 9:
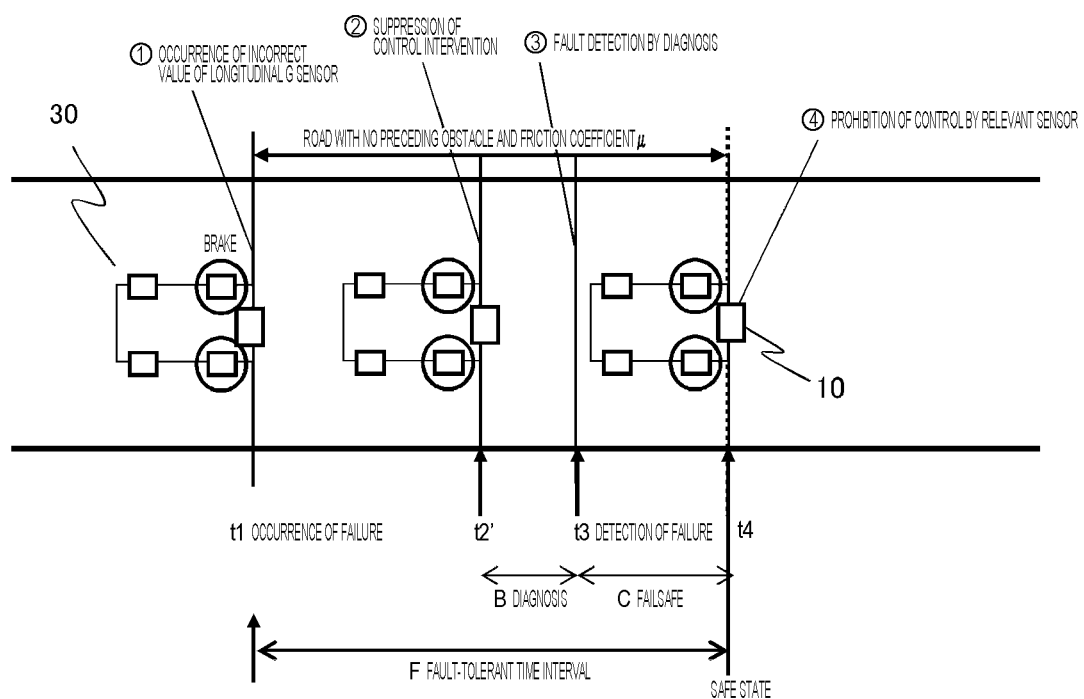
FIG. 9 is a view illustrating a travel model of a vehicle based on the longitudinal G sensor according to the present embodiment.

FIG. 8 is a view illustrating a general travel model of the vehicle 30 based on a longitudinal G sensor, and FIG. 9 is a view illustrating a travel model of the vehicle 30 based on the longitudinal G sensor according to the present embodiment. In FIGS. 8 and 9, a travel path of the vehicle 30 is the same, there is no obstacle on the travel path, and the friction coefficient μ of the road is set to a friction coefficient that does not hinder travel.

As illustrated in FIG. 8, a time between time t1 and time t4 corresponds to the fault-tolerant time interval FTTI. It is assumed that a driver lightly depresses a foot brake at time t1. At this time, if assuming that an incorrect longitudinal G sensor value has been generated, this value is transmitted to the control unit, for example, it is determined as sudden brake, and the ABS, which is not originally required, is activated so as not to lock tires. Diagnosis is performed between time t2 to time t3, and as a result of diagnosis, it is detected that the longitudinal G sensor is faulty, fail safe is performed between time t3 and time t4, and control intervention using the longitudinal G sensor is prohibited after time t4.

In the present embodiment, it is assumed that the driver lightly depresses the foot brake at time t1 as illustrated in FIG. 9. At this time, if assuming that an incorrect longitudinal G sensor value is generated, this value is transmitted to the control unit. Meanwhile, the control unit determines that the vehicle 30 is traveling on a road having no obstacle and having a friction coefficient that does not hinder travel, and prohibits the control intervention based on the incorrect longitudinal G sensor value at time t2'. Then, diagnosis is performed, and as a result of diagnosis, it is detected that the longitudinal G sensor is faulty, fail safe is performed between time t3 and time t4, and control intervention using the longitudinal G sensor is prohibited after time t4.

FIG. 10 is a view illustrating an example of travel environment information created by the travel environment information creation unit 13. The travel environment information creation unit 13 creates the travel environment information illustrated in FIG. 10 based on information indicating a straight road and information indicating the friction coefficient μ of a road surface, which have been recognized by the image recognition unit 12, and vehicle information such as a steering angle from the vehicle 30.

Travel environment information C1 on the first row of FIG. 10 indicates an example of travel environment data including a CAN ID and Data 1 to Data 3. The travel environment information C1 indicates that Data 1 is a straight road, Data 2 is 100 m, and Data 3 is the reliability of 90%. That is, the image recognition unit 12 recognizes that the front side of the vehicle 30 is the 100 m straight road, and indicates that the reliability of recognition is 90%. Incidentally, the determination on whether the road is a straight road may also be made additionally considering the steering angle of the vehicle information.

Travel environment information C2 indicates that there is an obstacle (such as a preceding vehicle) at a distance of 80 m on the front side, and the reliability is 99%. Travel environment information C3 indicates that the friction coefficient μ of the road surface on the front side is 0.60 and the reliability is 70%. Here, the reliability represents the reliability of recognition based on a time when an obstacle and a lane are continuously recognized. For example, there is a higher possibility of noise as the recognition time is shorter, and the reliability is lower. Conversely, the recognition is more stable as the recognition time is longer, and the reliability is higher. In addition, for example, if the 100 m straight road is recognized based on the image and the steering angle according to the vehicle information is zero, the reliability is increased.

FIG. 11 is a view illustrating an example of the threshold table 213 of the threshold calculation unit 21.

The travel environment information is converted into the format of the condition parameter including Conditions 1 to 3 by the arithmetic unit 212, and is input to the threshold table 213. In addition, the sensor identifier is input from the CAN decoder 211 to the threshold table 213. The threshold table 213 stores the control threshold to be output in accordance with the input sensor identifier and condition parameter. When the sensor identifier is the yaw rate sensor and the condition parameter is a straight road of 100 m or longer, information D1 in the first row of FIG. 11 indicates that the control threshold of the yaw rate sensor is 30%. Incidentally, this case corresponds to the favorable travel environment, and the control threshold may be set to 0% regarding that, even if there is an output of the yaw rate sensor, the output is an incorrect output value.

In information D2 to information D3, a linear distance is shorter than 100 m, and the control threshold is increased accordingly. Information D4 indicates that the control threshold of the longitudinal G sensor is set to 50% when the sensor identifier is the longitudinal G sensor and there is an obstacle on the front side 30 m or farther ahead. In information D5 to information D6, when there is an obstacle on the front side within 30 m, the control threshold is increased in accordance with the friction coefficient of the road surface.

Incidentally, the reliability (Data 3) of the travel environment data illustrated in FIG. 10 is not used in the threshold table 213 illustrated in FIG. 11, but may be used. For example, the control threshold to be output is multiplied by % indicating the reliability, and the resultant is output as the control threshold. Specifically, when the control threshold of the yaw rate sensor is 30% and the reliability is 90%, the control threshold of the yaw rate sensor×30%×90% is output as the control threshold.

Figure 12:
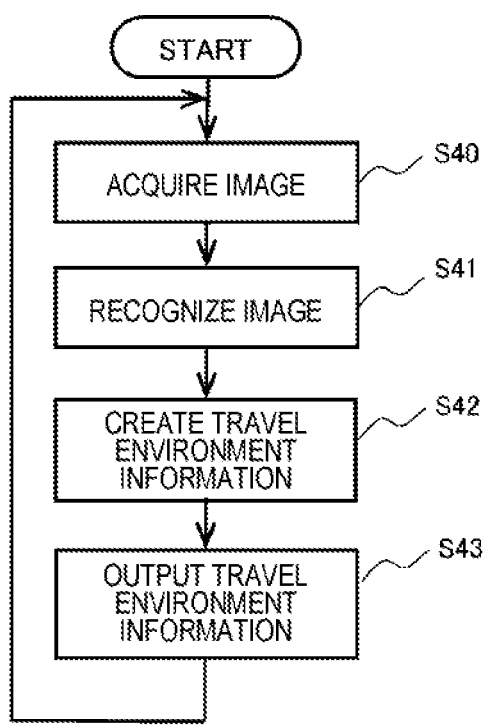
FIG. 12 is a flowchart illustrating processing of a travel environment determination unit.

FIG. 12 is a flowchart illustrating processing of the travel environment determination unit 10.

In Step S40 of FIG. 12, image information captured by the camera 11 is acquired. In Step S41, the image recognition unit 12 recognizes the image information, and recognizes how many meters the straight road where the vehicle is traveling and how many meters ahead there is an obstacle on the front side. In addition, a friction coefficient of the road is obtained based on the image information of a road surface.

In Step S42, the travel environment information creation unit 13 creates the travel environment information described in FIG. 10 based on the recognized image information and the input vehicle information. Further, the created travel environment information is output to the control unit 20 in the data format of CAN in Step S43. Thereafter, the processing returns to Step S40 to repeat the process. As a result, the recognized straight road, the front obstacle, the friction coefficient of road surface, and the like are quantified as the travel environment information, and are output to the control unit 20 at a constantly set cycle.

Figure 13:
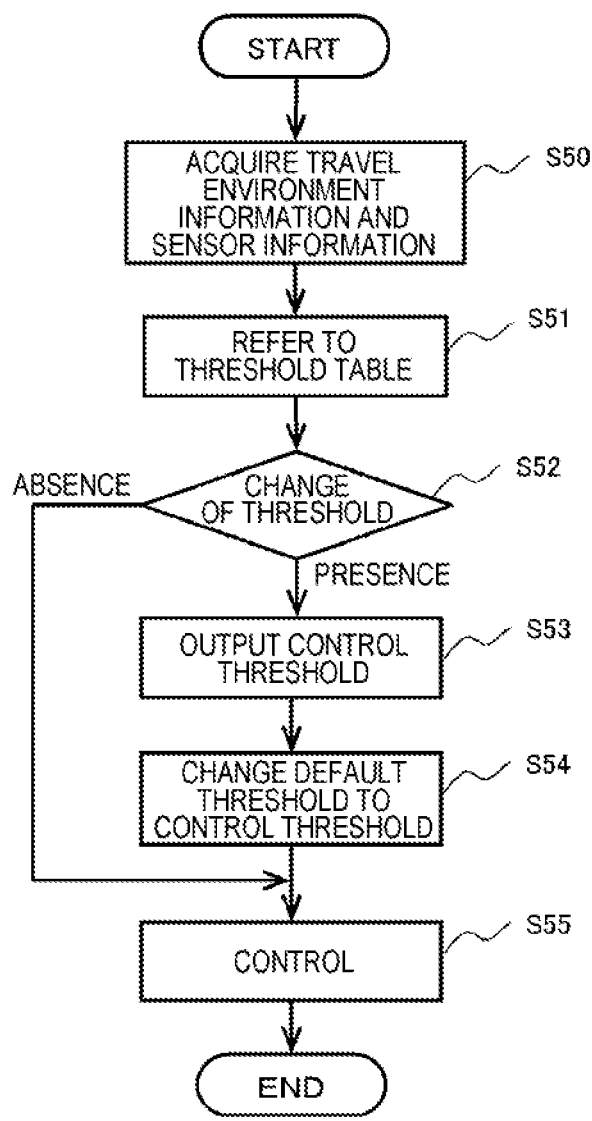
FIG. 13 is a flowchart illustrating processing of a control unit.

FIG. 13 is a flowchart illustrating processing of the control unit 20.

In Step S50 of FIG. 13, the travel environment information input from the travel environment information creation unit 13 and the sensor information of the behavior sensor 32 input from the vehicle 30 are acquired. In Step S51, the threshold table 213 illustrated in FIG. 11 is referred to based on the sensor identifier and the condition parameter based on the travel environment information. In Step S52, it is determined whether there is an input of a condition parameter matching the threshold table 213, and the processing proceeds to Step S53 when there is the input of the matching condition parameter, that is, when the threshold is to be changed. In Step S53, the control threshold with the matching condition parameter and sensor identifier is read from the threshold table 213 and output. Further, the default threshold of the sensor is changed to the control threshold in Step S54, and the processing proceeds to Step S55. The processing also proceeds to Step S55 when there is no input of the condition parameter matching the threshold table 213 in Step S52. Although the actuator 31 is controlled based on the sensor value output from the behavior sensor 32 in Step S55, no control intervention is performed when the sensor value exceeds the control threshold when the default threshold of the sensor has been changed to the control threshold.

For example, when it is output that the control threshold of the yaw rate sensor is set to 30% in the case of the straight road of 100 m or longer according to the information D1 of the threshold table 213 illustrated in FIG. 11, the control threshold is changed to a value of 30% of the default threshold in Step S54. Further, the control intervention is not performed when the value of the yaw rate sensor exceeds the control threshold in Step S55. In addition, for example, when it is output that the control threshold of the longitudinal G sensor is set to 50% in a case where there is an obstacle on the front side 30 m or farther ahead according to the information D4 of the threshold table 213 illustrated in FIG. 11, the control threshold is changed to a value of 50% of the default threshold in Step S54. Further, the control intervention is not performed when the value of the longitudinal G sensor exceeds the control threshold in Step S55.

Figure 14:
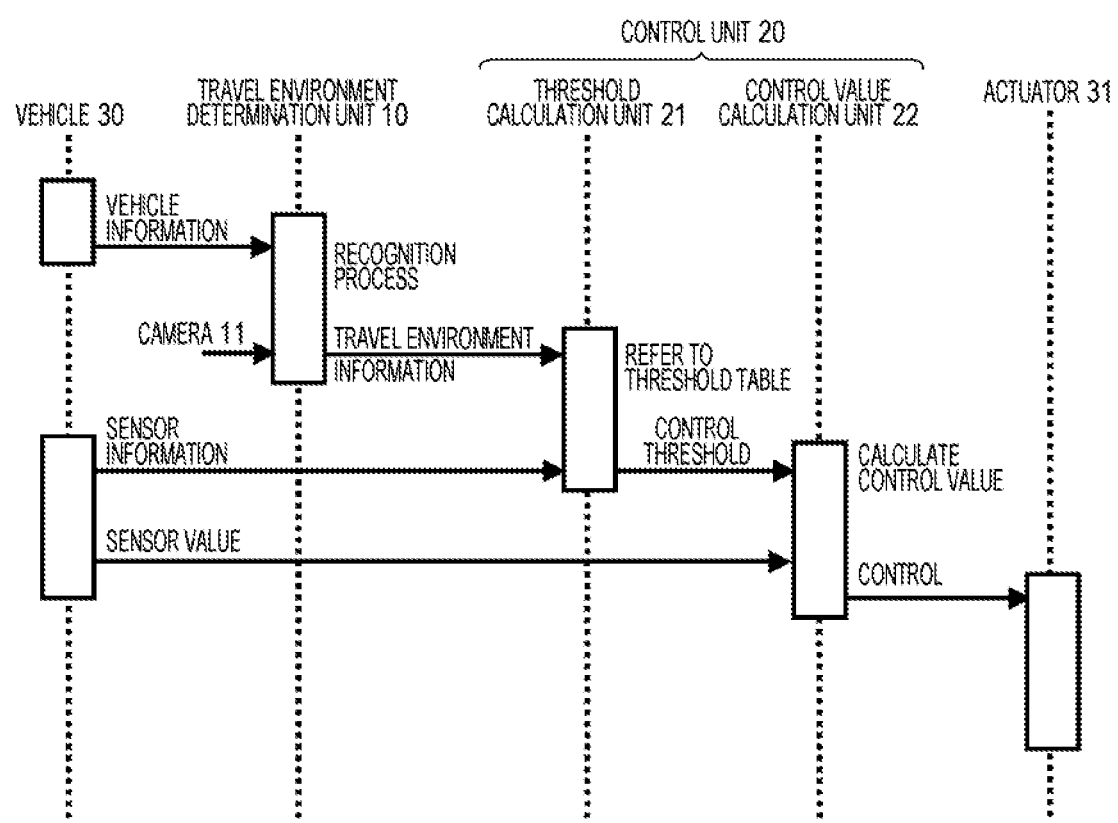
FIG. 14 is a view illustrating an operation sequence of the on-vehicle control device.

FIG. 14 is a view illustrating an operation sequence of the on-vehicle control device.

The travel environment determination unit 10 acquires vehicle information such as a steering angle from the vehicle and image information from the camera 11. Further, the image information is recognized, and travel environment information of the vehicle 30 is created with reference to the vehicle information and is output to the threshold calculation unit 21. The threshold calculation unit 21 outputs the control threshold with reference to the threshold table 213 based on the travel environment information and the sensor information from the vehicle 30. When no control threshold is input from the threshold calculation unit 21, the control value calculation unit 22 controls the actuator 31 of the vehicle 30 based on the input sensor value. In addition, when the control threshold is input from the threshold calculation unit 21, the control value calculation unit 22 changes the default threshold of the sensor to a lower control threshold, and as a result, control intervention due to the temporarily incorrect value of the behavior sensor 32 is suppressed.

According to the present embodiment, the image information of the camera typically mounted on the vehicle is recognized to suppress the control intervention when the travel environment of the vehicle is favorable, and thus, it is possible to suppress the control intervention based on the temporarily incorrect value of the sensor without multiplexing sensors to be mounted.

According to the above-described embodiment, the following operational effects are obtained.

(1) The on-vehicle control device 1 includes: the control unit 20 that controls an attitude of the vehicle 30 based on a value of the behavior sensor 32 that detects a behavior of the vehicle 30, and prohibits control based on the behavior sensor 32 when the value of the behavior sensor 32 exceeds a threshold; and the travel environment determination unit 10 that determines a travel environment of the vehicle 30 based on image information captured by the camera 11, and in which the control unit 20 changes the threshold to a lower value based on the travel environment by the travel environment determination unit 10. As a result, the control intervention based on the incorrect value of the behavior sensor 32 can be suppressed.

(2) The control unit 20 changes the threshold to a lower value when the travel environment is a predetermined travel environment. As a result, the control intervention based on the incorrect value of behavior sensor 32 can be suppressed in accordance with the predetermined travel environment.

(3) The behavior sensor 32 is the yaw rate sensor that detects a yaw rate of the vehicle 30, and the control unit 20 changes the threshold of the yaw rate sensor to a lower value when the travel environment determination unit 10 determines that the vehicle 30 is traveling on a straight road. As a result, it is possible to suppress the control intervention based on the incorrect value of the yaw rate sensor while the vehicle 30 is traveling on the straight road.

(4) The travel environment determination unit 10 acquires information on a steering angle from the vehicle 30 in addition to the image information captured by the camera 11, and determines that the vehicle 30 is traveling on a straight road. As a result, it is possible to more reliably determine that the vehicle 30 is traveling on the straight road.

(5) The behavior sensor 32 is an acceleration sensor that detects a longitudinal acceleration of the vehicle 30, and the control unit 20 changes the threshold of the acceleration sensor to a lower value when the travel environment determination unit 10 determines that a distance between the vehicle 30 and the obstacle ahead is equal to or longer than a predetermined distance. As a result, it is possible to suppress the control intervention based on the incorrect value of the acceleration sensor while the vehicle 30 is traveling on a road having no obstacle on the front side.

(6) The travel environment determination unit 10 determines a friction coefficient of a road on which the vehicle 30 is traveling based on the image information captured by the camera 11, and the control unit 20 changes the threshold of the acceleration sensor to a lower value in accordance with the friction coefficient of the road. As a result, it is possible to suppress the control intervention based on the incorrect value of the acceleration sensor during travel on a road having a high friction coefficient.

(7) The threshold table 213 is further provided to store the travel environment determined by the travel environment determination unit 10 in association with the threshold, which needs to be changed to a lower value, of the behavior sensor 32, and the control unit 20 reads the threshold, which needs to be changed to a lower value in accordance with the travel environment, from the threshold table 213 and changes the threshold. As a result, the threshold can be changed in accordance with the travel environment.

Modified Example

The present invention can be implemented by modifying the above-described embodiment as follows.

(1) The description has been given with the example in which the on-vehicle control device 1 includes the travel environment determination unit 10 and the control unit 20 and performs the processing illustrated in the flowcharts of FIGS. 12 and 13. However, programs illustrated in these flowcharts may be realized by execution using a computer that includes a CPU, a memory, and the like. Further, these programs may be supplied as various forms of computer-readable computer program products such as a recording medium and a data signal (carrier wave).

(2) The description has been given regarding the configuration in which the travel environment determination unit 10 includes the camera 11, the image recognition unit 12, and the travel environment information creation unit 13. However, the camera 11 may be configured as a lens of a camera, and a portion corresponding to the travel environment determination unit 10 having the functions of the image recognition unit 12 and the travel environment information creation unit 13 may be configured as a camera or a stereo camera.

The present invention is not limited to the above-described embodiments, and other modes, which are conceivable inside a scope of a technical idea of the present invention, are also included in a scope of the present invention as long as characteristics of the present invention are not impaired. In addition, the invention may be configured by combining the embodiments and modified examples.

The disclosed content of the following priority application is incorporated herein as the citation.

Japanese Patent Application No. 2017-026757 (filed on Feb. 16, 2017)

REFERENCE SIGNS LIST

1 on-vehicle control device
10 travel environment determination unit
11 camera
12 image recognition unit
13 travel environment information creation unit
20 control unit
21 threshold calculation unit
22 control value calculation unit
31 actuator
32 behavior sensor
211 CAN decoder
212 arithmetic unit
213 threshold table

The invention claimed is:

1. An on-vehicle control device comprising:
a control unit that controls an attitude of a vehicle based on a value of a behavior sensor that detects a behavior of the vehicle, and prohibits control via a control intervention based on the behavior sensor when the value of the behavior sensor exceeds a threshold; and
a travel environment determination unit that determines a travel environment of the vehicle, wherein
the behavior sensor is an acceleration sensor that detects a longitudinal acceleration of the vehicle,
the control unit changes the threshold of the acceleration sensor to a lower value when the travel environment determination unit determines that a distance between the vehicle and an obstacle on a front side is longer than a distance stored in the on-vehicle control device,
the control intervention is suppressible based on an incorrect value of the acceleration sensor while the vehicle is traveling on a road having no obstacle on the front side; and
the travel environment determination unit includes at least a camera.

2. The on-vehicle control device according to claim 1, wherein
the control unit changes the threshold to a lower value when the travel environment is a predetermined travel environment.

3. The on-vehicle control device according to claim 1, wherein
the behavior sensor is a yaw rate sensor that detects a yaw rate of the vehicle, and
the control unit changes the threshold of the yaw rate sensor to a lower value when the travel environment determination unit determines that the vehicle is traveling on a straight road.

4. The on-vehicle control device according to claim 3, wherein
the travel environment determination unit acquires information on a steering angle from the vehicle in addition to the image information captured by the camera to determine that the vehicle is traveling on the straight road.

5. The on-vehicle control device according to claim 1, wherein
the travel environment determination unit determines a friction coefficient of a road on which the vehicle is traveling, based on the image information captured by the camera, and
the control unit changes the threshold of the acceleration sensor to a lower value in accordance with the friction coefficient.

6. The on-vehicle control device according to claim 1, further comprising
a storage unit that stores the travel environment determined by the travel environment determination unit in association with the threshold, which needs to be changed to a lower value, of the behavior sensor,
wherein the control unit reads the threshold, which needs to be changed to a lower value in accordance with the travel environment, from the storage unit and changes the threshold.

\* \* \* \* \*